(12) United States Patent
Schindler et al.

(10) Patent No.: US 8,145,380 B2
(45) Date of Patent: Mar. 27, 2012

(54) MOTOR VEHICLE CONTROL SYSTEM

(75) Inventors: Thomas Schindler, Grossheirath (DE);
Stefan Richter, Michelau (DE); Jürgen Neumann, Ebersdorf b. Coburg (DE);
Torsten Mager, Schwalmtal (DE)

(73) Assignee: Brose Fahrzeugteile GmbH & Co., Coburg (DE)

( * ) Notice: Subject to any disclaimer, the term of this patent is extended or adjusted under 35 U.S.C. 154(b) by 864 days.

(21) Appl. No.: 12/090,235

(22) PCT Filed: Sep. 7, 2006

(86) PCT No.: PCT/EP2006/008712
§ 371 (c)(1),
(2), (4) Date: Aug. 26, 2008

(87) PCT Pub. No.: WO2007/045307
PCT Pub. Date: Apr. 26, 2007

(65) Prior Publication Data
US 2008/0319607 A1    Dec. 25, 2008

(30) Foreign Application Priority Data
Oct. 15, 2005    (DE) .................. 20 2005 016 196 U

(51) Int. Cl.
*B60L 11/00* (2006.01)
*B60L 1/00* (2006.01)

(52) U.S. Cl. .................. 701/34.2; 701/22; 307/9.1
(58) Field of Classification Search .............. 701/22, 701/36, 34.2; 307/9.1, 10.1, 10.6, 10.7, 43, 307/52
See application file for complete search history.

(56) References Cited

U.S. PATENT DOCUMENTS

| | | | |
|---|---|---|---|
| 6,661,119 B2 * | 12/2003 | Liu et al. | 307/71 |
| 6,737,763 B2 * | 5/2004 | Liu et al. | 307/58 |
| 7,978,600 B2 * | 7/2011 | Itabashi et al. | 370/229 |

FOREIGN PATENT DOCUMENTS

| | | |
|---|---|---|
| DE | 103 12 553 | 7/2004 |
| EP | 0 515 042 | 11/1992 |
| WO | WO 02/076794 | 10/2002 |

* cited by examiner

*Primary Examiner* — Yonel Beaulieu
(74) *Attorney, Agent, or Firm* — Scott T. Weingaertner; Joseph D. Eng, Jr.; King & Spalding LLP

(57) ABSTRACT

The invention relates to a control system for a motor vehicle, including a first electronic control system for controlling a first load current of a first load and a second electronic control system for controlling a second load current of a second load. The first electronic control system and the second electronic control system are arranged at a distance from one another and are connected to one another. At least the second electronic control system has a sleep mode and an operating mode, and only the first electronic control system can switch the second electronic control system from the sleep mode into the operating mode.

11 Claims, 2 Drawing Sheets

MOTOR VEHICLE CONTROL SYSTEM

FIELD OF THE INVENTION

The invention relates to a control system for a motor vehicle.

BACKGROUND OF THE INVENTION

Bus systems and subbus systems are used in motor vehicles, electronic systems of the motor vehicle having a bus node and communicating with one another via bus connections in order to perform control operations and/or to exchange data. If the motor vehicle is not used, a large number of these electronic systems are switched into a sleep mode in order to reduce as far as possible the overall power consumption of the motor vehicle and therefore the power drain from a motor vehicle battery.

If a function of an electronic system is requested by, for example, activating a pushbutton key of the electronic system, this electronic system is switched from the sleep mode into an operating mode in order to carry out the function. For this purpose, the electronic system has a wakeup circuit which brings about switching from the sleep mode into an operating mode. Likewise, this electronic system can be woken up by a wakeup signal from another electronic system of the motor vehicle, which signal is transmitted from bus node to bus node via the bus system.

SUMMARY OF THE INVENTION

The invention is based on the object of specifying a motor vehicle system which permits loads to be controlled and simplifies switching between an operating mode and a sleep mode as far as possible.

Accordingly, a control system is provided with a first electronic control system for controlling a first load current of a first load and with a second electronic control system for controlling a second load current of a second load. The first electronic control system and/or the second electronic control system preferably have a computing unit, in particular a microcontroller, and a power switch, in particular a power semiconductor or a relay, for energizing the first or second load. The load is, for example, an electric motor.

The first electronic control system and the second electronic control system are arranged at a distance from one another and are connected to one another. Although the first electronic control system and the second electronic control system can in principle be connected via an optical line connection or via an air interface, for example by radio, the first electronic control system and the second electronic control system are, however, preferably connected to one another via an electric line or a cable harness.

At least the second electronic control system has a sleep mode and operating mode. In the sleep mode the power drain is significantly reduced compared to the operating mode. The second electronic control system can carry out control functions only in the operating mode. Only the first electronic control system is designed to switch the second electronic control system from the sleep mode into the operating mode. Switching from the sleep mode into the operating mode causes a program to run in the second electronic control system in order to carry out control functions. Furthermore, in the operating mode, communication advantageously takes place between the first electronic control system and the second electronic control system.

If the first electronic control system can also be switched between an operating mode and a sleep mode, the first electronic control system is preferably designed to switch the second electronic control system from the sleep mode into the operating mode only when it is in its own operating mode.

In one advantageous embodiment, a switching device is provided which is designed to switch off a power supply of the second electronic control system in the sleep mode. In order to switch off the power supply of the second electronic control system, said electronic control system can be disconnected from a voltage supply, for example the battery voltage or from a ground connection, by the switching device. The switching off of the power supply by the switching device therefore prevents any current from flowing through the second electronic control system. The switching device advantageously has a switching transistor which can be actuated via a driver stage.

According to a further embodiment, the first electronic control system is connected to the switching device in order to switch on the power supply of the second electronic control system for the operating mode. The electronic control system advantageously has a control output which is connected to a control input of the switching device. The power supply can preferably only be switched on but not switched off via this connection.

In one preferred development, only the second electronic control system is designed to switch itself into the sleep mode. This permits reliable storage of data which is required for control functions in the next operating mode. It is a precondition that the second electronic control system can switch into the sleep mode autonomously, and therefore independently of another electronic system.

In one development variant, the first electronic control system is designed to disconnect a load line for supplying power to the second load. Undefined states of the second electronic control system therefore cannot lead to undesired actuation of the second load during the switching from the operating mode to the sleep mode since said load cannot be energized owing to the disconnection of the load line. The switching device preferably has a power switch which is designed to carry out disconnection operations and is connected to the load line, said power switch being in particular a relay which can be actuated by the first electronic control system.

The first electronic control system advantageously has a bus node. The first electronic control system can communicate via this bus node with a central electronic system in the motor vehicle via a bus connection, in particular via a CAN bus. It is advantageously possible to transmit data, for example control data of the first electronic control system and/or of the second electronic control system, between the central electronic system and the first electronic control system and/or the second electronic control system via the bus connection.

In one embodiment there is provision that the second electronic control system can be switched from the sleep mode into the operating mode by the central electronic system via the bus connection and via the first electronic control system. For example, it may be necessary, in order to close a folding roof of the motor vehicle, for a window lifter which can be controlled by the second electronic control system to be actuated in a lowering direction by the central electronic system.

According to one preferred development, a number of functions of the second load can be controlled by the first electronic control system via an interface between the first electronic control system and the second electronic control system. The number can be composed, for example, of a single function by virtue of the fact that the second load which is connected to the second electronic control system is operated for a defined time period. For example, the second electronic control system is a door control unit of a rear motor vehicle door, in which case a plurality of functions of functional units of the rear vehicle door can be remote controlled via the interface by a control console, connected to the first electronic control system, in the driver's door. It is also possible for the interface to be of bidirectional design so that one or more functions of the first load which is connected to the first electronic control system can be remote controlled via the second electronic control system.

According to one advantageous embodiment, during the operating mode, the operating mode can be obtained by means of a logic OR operation by the first electronic control system or by the second electronic control system.

According to one preferred application, the first electronic control system is arranged in a front vehicle door and is connected to a window lifter of the front vehicle door as a first load. The second electronic control system is arranged in a rear vehicle door and is connected to a window lifter of the rear vehicle door as a second load. Furthermore, further loads, such as a mirror adjustment system or a front end light, may be controlled by the first electronic control system and/or by the second electronic control system.

DETAILED DESCRIPTION

Figure 1:
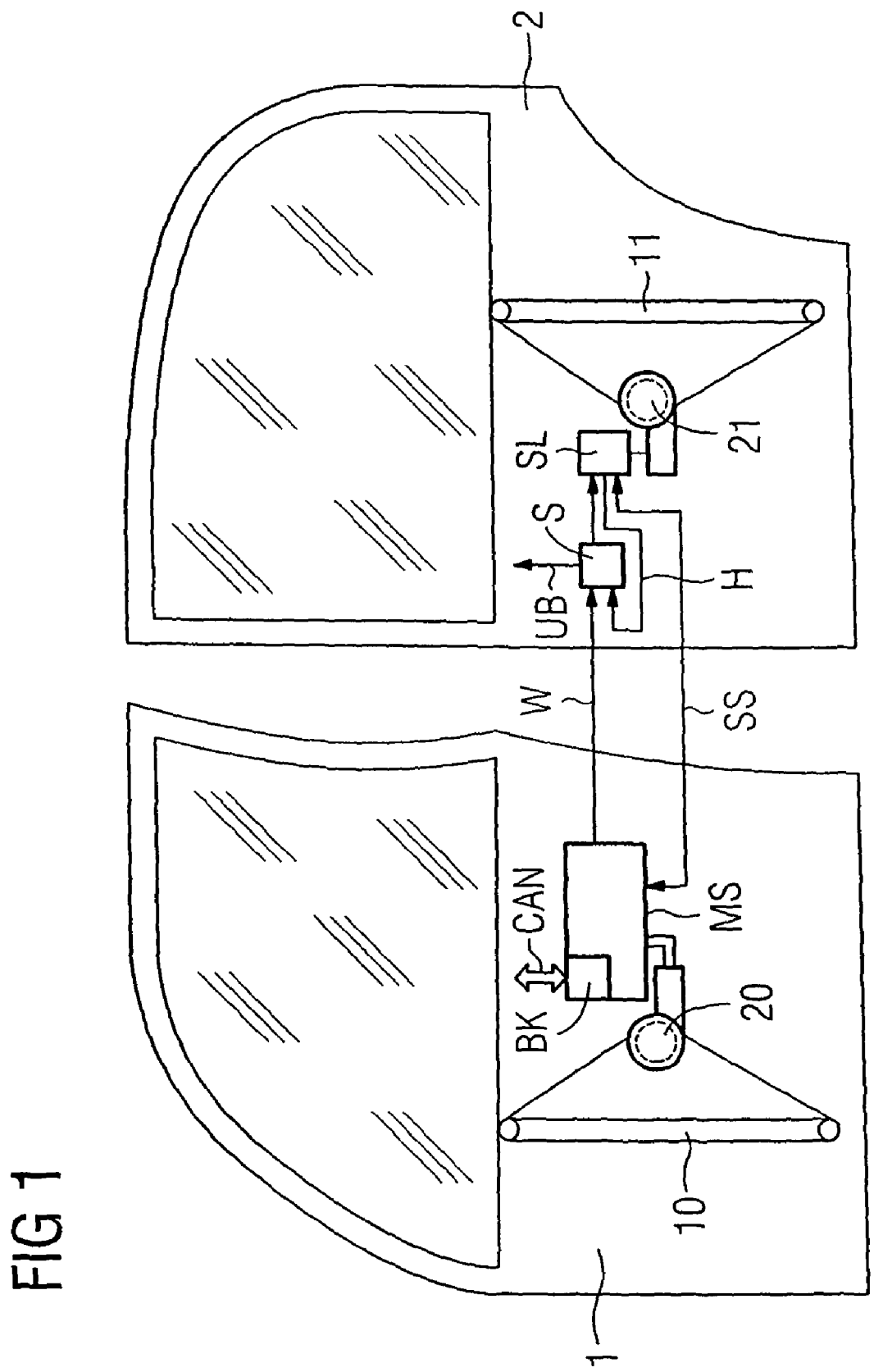
FIG. 1 shows a front vehicle door and a rear vehicle door, each with a window lifter and an assigned electronic control system.

Two vehicle doors 1 and 2 of a motor vehicle are illustrated schematically in FIG. 1. A front motor vehicle door 1 has a first window lift 10 with a first drive 20. The drive 20 has in turn an electric motor and a gear mechanism. The electric motor of the drive 20 is controlled by a master electronic control system MS. The master electronic control system MS has, for this purpose, power switches in the form of relays and a microcontroller which is connected to the power switches. This microcontroller is additionally configured to control the window lifter drive 20 as a bus node BK of a CAN bus. As an alternative to a CAN bus (CAN: Controller Area Network) it is also possible to use a MOST network (MOST: Media Oriented Systems Transport) or a LIN bus (LIN: Local Interconnect Network). The bus connection permits control and measurement data to be exchanged with a central control unit of the motor vehicle (not illustrated in FIG. 1).

Furthermore, the master electronic control system MS can wake up so that an event, such as an activation of a pushbutton key which is assigned to the window lifter 10, wakes up the master electronic control system MS from a sleep mode into an operating mode. Likewise it is possible to wake up the master electronic control system MS via the CAN bus connection. If a number of state conditions for the sleep mode are met, the master electronic control system MS goes into the sleep mode automatically.

The number of state conditions for the sleep mode can have precisely the one state condition that the master electronic control system MS no longer controls a functional unit such as the window lifter drive 20. Further possible state conditions are a switch position of a key switch, an operating state of a generator of the motor vehicle or storage of control related data. A combined evaluation of a plurality of state conditions can also take place.

A rear motor vehicle door 2 has a second window lifter 11 with the second drive 21. The electric motor of the second drive 21 is connected to a slave electronic control system SL. The slave electronic control system SL is not capable of waking up automatically and can only be woken up from a sleep mode into an operating mode by the master electronic control system MS. A switching device S is provided which in the sleep mode switches off the slave electronic control system SL from a supply voltage terminal UB.

The switching device S is connected to the slave electronic control system SL via a self-locking connection H. The slave electronic control system SL is configured via this connection H and is designed to lock itself in the operating mode and therefore can also switch itself from the operating mode into the sleep mode. The slave electronic control system SL can be woken up via a wakeup connection W only by the master electronic control system MS. For this purpose, the master electronic control system MS provides a control potential to the switching device S via the connection W, which switching device S connects the supply voltage terminal UB to the slave electronic control system SL as a function of this control potential. Communication can then take place between the master electronic control system MS and the slave electronic control system SL via a bidirectional interface SS. In the process, it is possible, for example, to transmit parameters or control data via the bidirectional interface SS.

Figure 2:
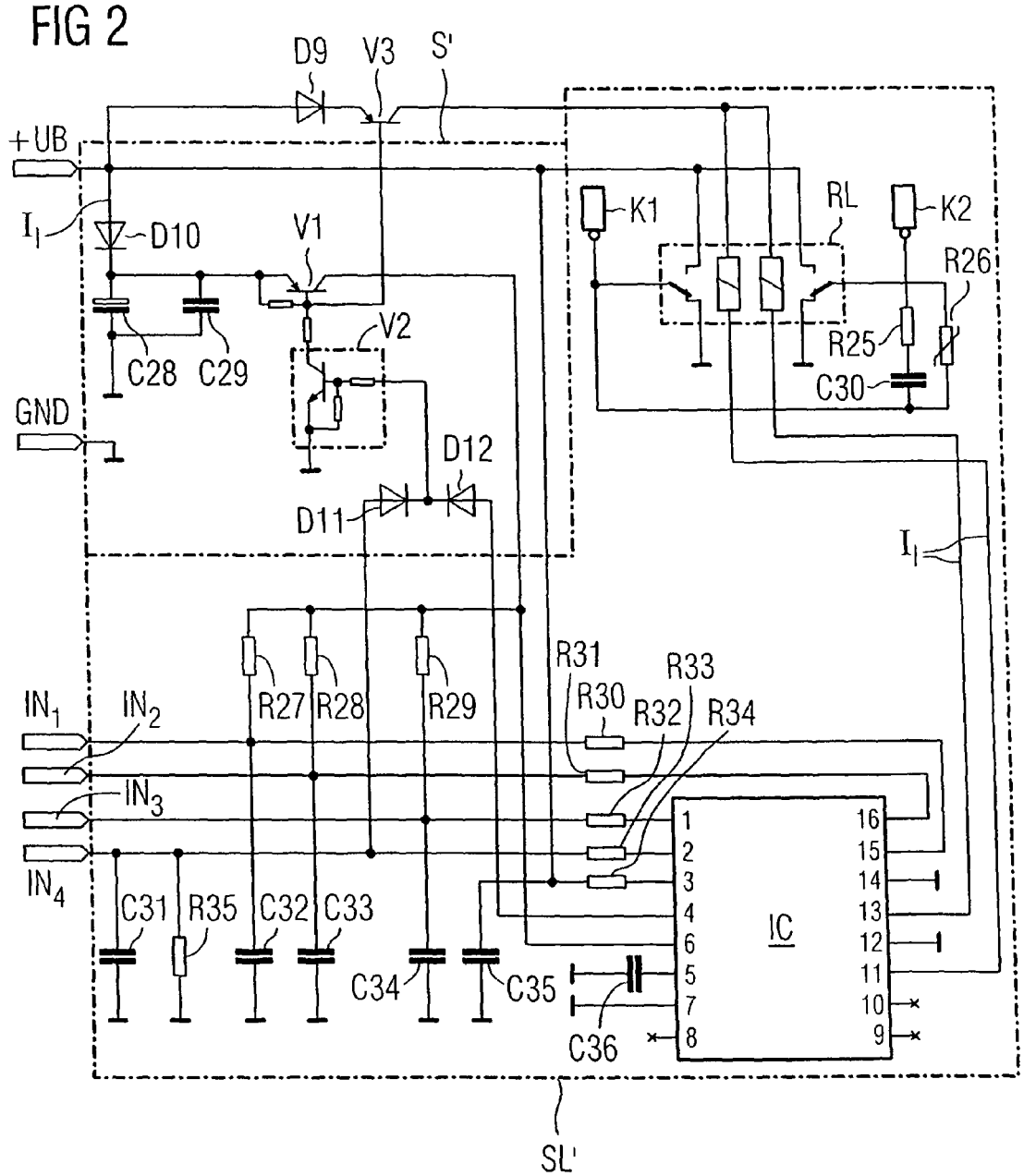
FIG. 2 is a circuit diagram of a slave electronic control system and a switching device.

An embodiment variant of a slave electronic control system SL' and an embodiment variant of a switching device S' are illustrated as circuit diagrams in FIG. 2. In contrast to FIG. 1, both the slave electronic control system SL' and the switching device S' are arranged on a circuit carrier in FIG. 2. An integrated circuit IC, which has a microcontroller, controls two relay coils of a double relay RL via the two connections 11 and 13. Switching contacts of the double relay RL are connected to motor terminals K1 and K2 and permit the drive motor (not illustrated in FIG. 2) to be energized in both directions as a function of the desired adjustment direction.

The relay coils are connected directly to a supply voltage terminal +UB via a pnp bipolar transistor V3, a diode D9 and the power terminals of the double relay RL. In the switched off state, the pnp bipolar transistor V3 is switched off so that only a leakage current $I_r$ of less than 1 µA flows. A program sequence of the integrated circuit IC controls the double relay RL as a function of one or more input signals at least one of the inputs In1, In2, In3 or In4 here, with an input signal being, for example, a window lifter pushbutton key which is arranged in the rear vehicle door 2.

Input In4 serves also to wake up the integrated circuit IC. For this purpose, a master electronic control system MS applies a position potential to the input In4 so that a current flows via a diode D3 and via a base of an npn bipolar transistor V2. The npn bipolar transistor V2 switches on the pnp bipolar transistor V1 and the pnp bipolar transistor V3 so that the integrated circuit IC is supplied with the voltage supply via a diode D10 and the pnp bipolar transistor V1. At this moment, the program sequence in the integrated circuit IC begins and said program sequence initializes the operating mode. The integrated circuit IC subsequently applies a positive potential to the output 5 and therefore goes into its operating mode itself.

In the operating mode, the pnp bipolar transistor V3 is also switched on so that a current through the relay coils of the double relay RL can be controlled by the integrated circuit IC. During the operating mode, the input In4 can be used as a bidirectional interface between the master electronic control system MS and the slave electronic control system SL.

The capacitor C28 serves to buffer the supply voltage for brief voltage dips. The other capacitors C29 to C36 serve to debounce or suppress interference. In the operating mode, the integrated circuit IC applies a positive potential to its terminal 4 so that a current flows via a diode D12 and via the base of the npn bipolar transistor V2. The locking signal for the operating mode of the slave electronic control system SL' and of the master electronic control system (MS) therefore have OR operations carried out on them. If the integrated circuit IC determines that there is no longer a request for a function of the slave unit SL', it applies a zero potential to its terminal 4 and as a result switches off its own voltage supply and is then in the sleep mode. The slave electronic control system SL' can be in turn woken from this sleep mode again only by the master electronic control system (MS).

What is claimed is:

1. A control system for a motor vehicle the control system comprising
    a first electronic control system for controlling a first load current of a first load; and a second electronic control system for controlling a second load current of a second load,
    wherein the first electronic control system and the second electronic control system are arranged at a distance from one another and are connected to one another,
    wherein at least the second electronic control system has a sleep mode and an operating mode, and
    wherein only the first electronic control system is adapted to switch the second electronic control system from the sleep mode into the operating mode.

2. The control system according to claim 1, further comprising a switching device that is configured to switch off a power supply of the second electronic control system in the sleep mode.

3. The control system according to claim 2, wherein the first electronic control system is connected to the switching device in order to switch on the power supply of the second electronic control system for the operating mode.

4. The control system according to claim 1, wherein only the second electronic control system is adapted to switch itself into the sleep mode.

5. The control system according to claim 1, wherein the first electronic control system is adapted to disconnect a load line for supplying power to the second load.

6. The control system according to claim 1, wherein the first electronic control system comprises a bus node, and wherein the first electronic control system communicates with a central electronic system via a bus connection.

7. The control system according to claim 6, wherein the second electronic control system is configured to be switched from the sleep mode into the operating mode by the central electronic system via the bus connection and via the first electronic control system.

8. The control system according to claim 1, wherein a plurality of functions of the second load are adapted to be controlled by the first electronic control system via a bidirectional interface between the first electronic control system and the second electronic control system.

9. The control system according to claim 1, wherein, during the operating mode, the operating mode can be obtained through a logic OR operation by the first electronic control system or by the second electronic control system.

10. The control system according to claim 1, wherein the first electronic control system is arranged in a front vehicle door and is connected to a window lifter of the front vehicle door as a first load, and
    wherein the second electronic control system is arranged in a rear vehicle door and is connected to a window lifter of the rear vehicle door as a second load.

11. A motor vehicle comprising a control system according to claim 1.

* * * * *